United States Patent [19]
Lang et al.

[11] Patent Number: 5,399,819
[45] Date of Patent: Mar. 21, 1995

[54] AIRBAG COVER HORN SWITCH

[75] Inventors: Gregory J. Lang; F. Paul Leonelli, both of Ogden; Bradley D. Harris, Farmington, all of Utah

[73] Assignee: Morton International, Inc., Chicago, Ill.

[21] Appl. No.: 219,629

[22] Filed: Mar. 29, 1994

[51] Int. Cl.⁶ .................. B60R 21/00; H01H 9/00
[52] U.S. Cl. ........................ 200/61.54; 280/731
[58] Field of Search ............ 200/61.54–61.57, 200/86 R; 280/727–735, 750; B60R 21/00, 21/16, 21/20

[56] References Cited

U.S. PATENT DOCUMENTS

| | | | |
|---|---|---|---|
| 4,314,114 | 2/1982 | Larson | 200/5 A |
| 4,551,595 | 11/1985 | Koenig et al. | 200/86 R |
| 4,612,425 | 9/1986 | Kanai et al. | 200/61.55 |
| 4,934,735 | 6/1990 | Embach | 280/731 |
| 5,002,306 | 3/1991 | Hiramitsu et al. | 280/731 |
| 5,062,661 | 11/1991 | Winget | 280/731 |
| 5,085,461 | 2/1992 | Shibata | 280/731 |
| 5,085,462 | 2/1992 | Gualtier | 280/731 |
| 5,118,910 | 6/1992 | Duhon et al. | 200/86 R |
| 5,186,490 | 2/1993 | Adams et al. | 280/731 |
| 5,198,629 | 3/1993 | Hayashi et al. | 200/61.54 |
| 5,265,904 | 11/1993 | Shelton et al. | 280/731 |
| 5,265,905 | 11/1993 | Shelton | 280/731 |
| 5,269,559 | 12/1993 | Filion et al. | 280/728 |
| 5,308,106 | 5/1994 | Heidorn | 280/728 B |

Primary Examiner—J. R. Scott
Attorney, Agent, or Firm—George W. Rauchfuss, Jr.; Gerald K. White

[57] ABSTRACT

A membrane horn switch has a flexible thin front plate and a rigid thick back plate. The plates are coated with a conductive layer which are separated by dielectric material applied to either or both plates. The plates are attached together around their perimeters using a pressure sensitive adhesive. The switch is attached directly to an airbag cover, eliminating the need for external backing other than that which is provided by the rigid back plate of the switch.

7 Claims, 2 Drawing Sheets

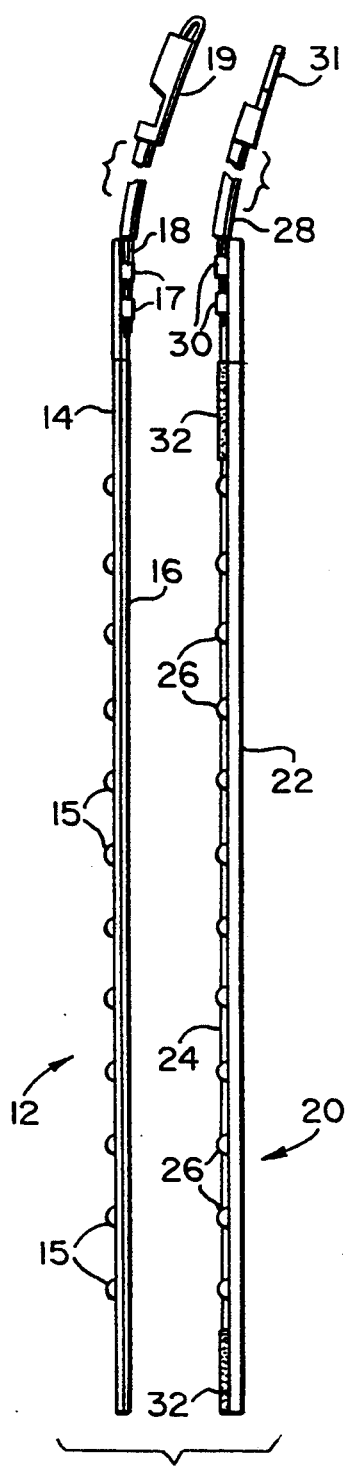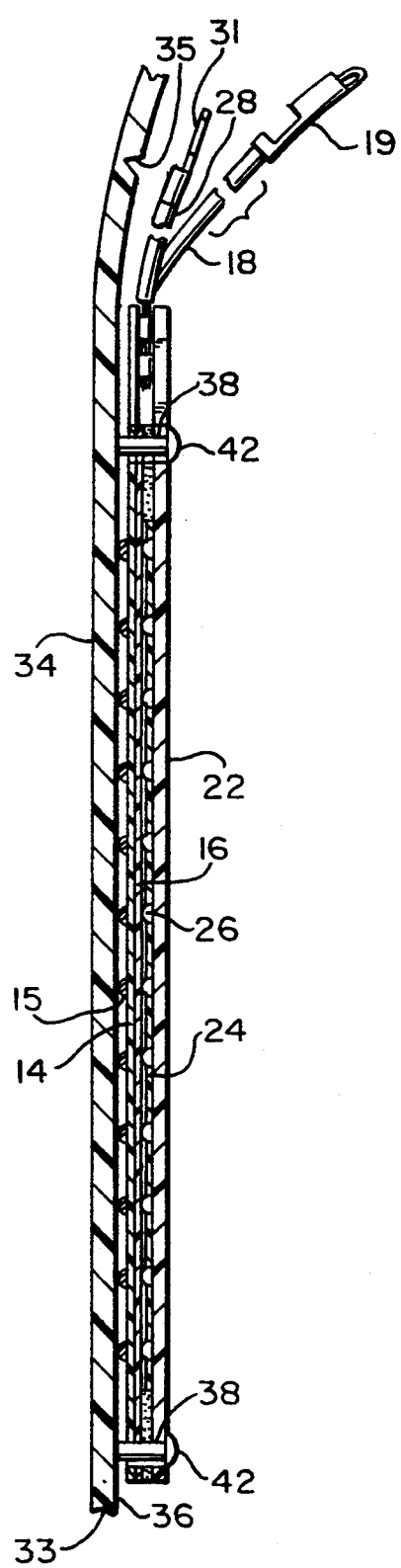
FIG. 2
FIG. 3

… ... …

AIRBAG COVER HORN SWITCH

BACKGROUND OF THE INVENTION

This invention relates to a driver's side airbag membrane horn switch assembly, and more particularly to a horn switch of the airbag assembly having a rigid back plate, which is integral with and carries elements of the membrane switch.

Driver side airbags are conventionally mounted on steering wheels along with horn blowing switch arrangements. A number of horn switch assemblies have been proposed which suffer disadvantages with respect to the method of mounting, as well as actuation inconsistency requiring improvement in both areas.

For example, in U.S. Pat. No. 5,186,490 assigned to the assignee of the present invention, the membrane horn switch is installed into a semi-rigid pocket which has been thermally bonded to the back of an airbag cover. Although satisfactory, this requires secondarily attaching a pocket to the cover for switch containment.

SUMMARY OF THE INVENTION

Accordingly, it is an object of this invention to provide a new and improved driver's side airbag assembly which is simple in construction and easily assembled.

Another object of the present invention is a new and improved driver's side membrane switch airbag assembly which is compact and easy to activate and produces a more uniform switch operation when installed on an airbag cover.

In carrying out this invention, in one illustrative embodiment thereof, a horn actuation switch is positioned behind a horn actuation area on the rear surface of an airbag module cover, the horn activation switch is one having a flexible thin front plate with a conductive coating thereon forming a first switch half and a rigid back plate with a conductive coating thereon forming a second switch half. A dielectric material is interposed between said first and second switch halves. The switch halves are attached around the perimeters thereof and the assembled switch is mounted on the perimeter thereof to the rear inner surface of said airbag modular cover.

BRIEF DESCRIPTION OF THE DRAWINGS

The invention, together with further aspects, features, objects and advantages thereof, will be more clearly understood from the following description taken in connection with the accompanying drawings.

FIG. 2 is an exploded side elevational view of the membrane horn switch shown in FIG. 1.

FIG. 3 is a cross sectional view of the horn switch of FIGS. 1 and 2 shown mounted on the inner surface of an airbag cover in accordance with the present invention.

DESCRIPTION OF THE PREFERRED EMBODIMENTS

Figure 1:
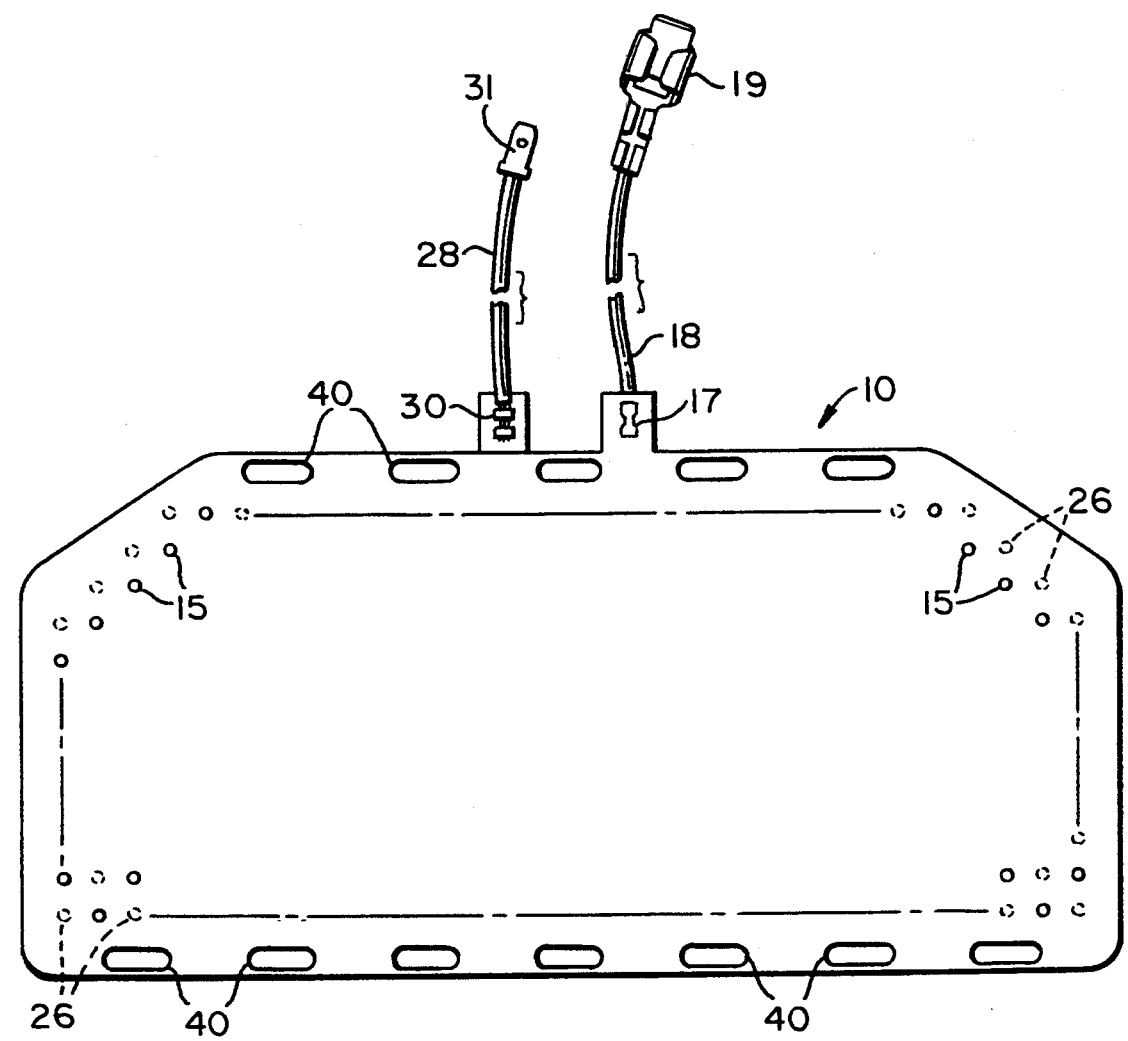
FIG. 1 is a front plan view of the membrane horn switch employed in the driver's side airbag horn switch assembly of the present invention.

Referring now to FIGS. 1 and 2, a membrane horn switch referred to generally with the reference numeral 10, is comprised of a first switch half 12 and a second switch half 20 as will best be seen in exploded view in FIG. 2. The first switch half 12 has a thin flexible front plate 14 of insulating material such as a suitable plastic material, for example, MYLAR polyester or polyethylene with a thickness of approximately 0.13 millimeters. The thin flexible front plate 14 contains an electrical conducting coating 16 on the inner surface thereof. The conductive coating 16 may be applied to the flexible front plate 14 by any suitable means, such as for example, by screening conductive ink thereon. An electrical connection is made to the conductive coating 16 by crimping the wire 18 onto the conductive coating 16 at location 17. The distal end of wire 18 is terminated in electrical terminal 19. In addition, a localized pattern of raised insulating material 15 may be applied to the front surface of the flexible front plate 14 to delineate or define a force concentration area for the horn switch 10.

The second switch half 20 comprises a rigid back plate 22 of suitable material, such as polyester, having a thickness of approximately 1 to 2 millimeters to provide the desired rigidity. Other materials, such as for example, rigid fiberglass can be employed. Because of the additional stiffness of this material a thickness of only approximately 0.8 millimeters is required. The rigid back plate 22 also is provided with an electrically conductive coating 24 on the front surface thereof which also may be constructed by screening conductive ink onto the front surface of the rigid back plate 22. A predetermined suitable pattern of dielectric material 26 is also applied to the second switch half 20 to prevent premature shorting of the switch 10. It will be appreciated that the dielectric material 26 can be applied to either or both the first and second switch halves as long as the dielectric material is capable of separating the switch halves to prevent undesired shorting. The thickness and associated shape or pattern of the dielectric material 26 can also be used to alter the sensitivity of the switch 10. The electrical connection to the switch half 20 is provided by the wire 28 which is crimped at 30 on the conductive coating 24. The other distal end of the electrical wire 28 contains an electrical terminal 31 for coupling the switch half 22 to external electrical circuitry utilized to actuate the horn (not shown) which the switch is designed to operate.

The first and second switch halves 12 and 20 are attached together around their perimeters using any suitable attaching means, such as by use of pressure sensitive tape 32, as will be seen in FIG. 2. In the assembled switch 10, pressure applied to the thin flexible front plate 14 of the first switch half 12 causes the conductive coating 16 on the flexible front plate 14 to contact conductive coating 24 on the rigid back plate 22 of the second switch half 20 thereby completing the circuit and activating the horn switch 10. The assembled switch 10 as seen in FIG. 3 is attached to an airbag cover 33 having a front outer surface 34 which may be provided with a tear line 35 therein. Front surface area 34 is utilized as a horn actuation area, that is, an area where force is applied to activate the horn switch 10. In a preferred form, the rear surface 36 of the airbag cover 33 has a plurality of spaced posts 38 extending therefrom which may be integrally formed on the rear surface 36. As will best be seen in FIG. 1, the assembled switch 10 has a plurality of slots 40 positioned along or around the periphery thereof which are disposed to accommodate the posts 38 extending from the rear surface 36 of airbag cover 33. In assembly, the holes 40 of switch 10 are positioned on the posts 38 such that the posts 38 extend through the holes 40. Then the switch 10 is secured to cover 33, such as by the distal ends 42 of said posts 38 being mushroomed, such as by using ultrasound or any other suitable type of heat to provide thermal staking. The switch 10 can be attached to the airbag using different types of thermal bonding along the outer perimeter or by using a thermal rivet. It will be appreciated that whichever process is utilized in attaching the switch to the airbag cover 33, it must be sufficiently attached thereto so that the switch 10 will not be separated from the cover 33 when the airbag inflates.

The switch 10 can be contoured to match the shape of the airbag cover 33 by using a thermal forming operation. The localized raised area 15 on the front of the flexible front plate 14 of the first switch half concentrates a load placed on said area of the switch when one presses on the front of the airbag cover 33 and thereby decreases the force required to activate the switch.

The driver's side airbag horn switch assembly in accordance with the present invention allows the switch to be attached directly to the back of the airbag cover, eliminating the need for any secondary attaching means such as a pocket to cover the switch for switch containment. The rigid backing of the switch which is an integral part of the second switch half of the horn switch of the present invention provides a rigid backing to allow for a more uniform switch operation when installed on the airbag cover and eliminates the need for other means or for the rigid backing to be provided by additional elements.

Since other changes and modifications varied to fit particular operating requirements and environments will be apparent to those skilled in the art, this invention is not considered limited to the examples chosen for purposes of illustration, and includes all changes and modifications which do not constitute a departure from the true spirit and scope of this invention as claimed in the following claims and equivalents thereof.

We claim:

1. A driver's side airbag horn switch assembly comprising:
    an airbag module cover having a front outer surface with a horn actuation area and a rear inner surface,
    a horn switch positioned behind said horn actuation area on the rear surface of said cover,
    said horn switch having a flexible thin front plate with a conductive coating thereon forming a first switch half and a rigid back plate with a conductive coating thereon forming a second switch half facing said first switch half,
    a dielectric material interposed between said first and second switch halves for preventing the shortening of said switch,
    means for attaching an outer perimeter of said first and second switch halves together with said dielectric material therebetween, and
    means for mounting said horn switch along the outer perimeter of the assembled switch to the rear inner surface of said airbag module cover.

2. The horn switch assembly as claimed in claim 1 wherein said means for mounting said horn switch comprises a plurality of holes through the outer perimeter of said switch, said plurality of holes mounted on a plurality of posts extending from said rear inner surface of said cover through said holes and said posts extending through said holes are secured therein by mushroomed distal ends of said posts.

3. The horn switch assembly as claimed in claim 1 having a raised localized area on said front plate for concentrating a load on said localized area for decreasing force required to activate said switch when installed on an airbag cover.

4. The horn switch assembly as claimed in claim 1 wherein said switch halves are attached around the perimeters thereof by pressure sensitive adhesive.

5. The horn switch assembly as claimed in claim 1 wherein the flexible thin front plate and the rigid back plate are both plastic.

6. The method of providing a driver's side airbag horn assembly having a membrane switch mounted on an airbag cover having front and rear surfaces comprising the steps of:
    depositing an electrically conductive coating on a thin flexible plate forming a first switch half, and depositing an electrically conductive coating on a rigid back plate forming a second switch half,
    applying a dielectric material in a predetermined pattern on at least one of said switch halves for separating said electrically conductive coatings on said switch halves after the switch is assembled,
    attaching an outer perimeter of said first and second switch halves together using pressure sensitive adhesive around the perimeter of said switch halves whereby the electrical conductive coatings on the switch halves face each other and are separated by said dielectric material,
    thermally bonding said switch onto the rear of the airbag cover.

7. The method as claimed in claim 6 wherein the means for said thermal bonding of said switch onto the rear of the airbag cover comprises ultrasound bonding.

* * * * *